United States Patent
Yaguchi et al.

(10) Patent No.: US 11,024,863 B2
(45) Date of Patent: Jun. 1, 2021

(54) FUEL CELL SYSTEM CONTROL METHOD AND FUEL CELL SYSTEM

(71) Applicant: NISSAN MOTOR CO., LTD., Yokohama (JP)

(72) Inventors: Tatsuya Yaguchi, Kanagawa (JP); Hayato Chikugo, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/630,660

(22) PCT Filed: Jul. 31, 2017

(86) PCT No.: PCT/JP2017/027757
§ 371 (c)(1),
(2) Date: Jan. 13, 2020

(87) PCT Pub. No.: WO2019/026146
PCT Pub. Date: Feb. 7, 2019

(65) Prior Publication Data
US 2020/0168933 A1  May 28, 2020

(51) Int. Cl.
*H01M 8/04225* (2016.01)
*H01M 8/04302* (2016.01)
(Continued)

(52) U.S. Cl.
CPC ... *H01M 8/04753* (2013.01); *H01M 8/04022* (2013.01); *H01M 8/04201* (2013.01);
(Continued)

(58) Field of Classification Search
CPC .................................................. H01M 8/04753
See application file for complete search history.

(56) References Cited

U.S. PATENT DOCUMENTS

| 2010/0304241 A1* | 12/2010 | Ooe | H01M 8/2484 |
| | | | 429/423 |
| 2013/0196239 A1 | 8/2013 | Otsuka et al. | |
| 2014/0212778 A1 | 7/2014 | Otsuka et al. | |

FOREIGN PATENT DOCUMENTS

| EP | 2 256 848 A1 | 12/2010 |
| EP | 2 416 420 A1 | 2/2012 |

(Continued)

*Primary Examiner* — James Lee
(74) *Attorney, Agent, or Firm* — Foley & Lardner LLP

(57) ABSTRACT

According to a control method of controlling a fuel cell system, the fuel cell system including a solid oxide fuel cell that is supplied with an anode gas and a cathode gas to generate electric power, a fuel processor that at least reforms fuel to generate the anode gas and supplies the generated anode gas to the fuel cell, and a combustor that combusts the supplied fuel to perform warming of the fuel processor, the method is conducted when warming is performed at least at starting-up of the system. The method comprising: a cathode gas supply step of supplying the cathode gas to the fuel processor; a determining step of determining whether a temperature of gas passing through the fuel processor is higher than a temperature at which reforming is possible; a cathode gas decreasing step of decreasing a supplied amount of the cathode gas to the fuel processor when it is determined that the temperature of the gas is higher than the temperature at which reforming is possible; and a fuel supply step of supplying the fuel to the fuel processor.

8 Claims, 12 Drawing Sheets

(51) Int. Cl.
  *H01M 8/04746* (2016.01)
  *H01M 8/04014* (2016.01)
  *H01M 8/04082* (2016.01)
  *H01M 8/0432* (2016.01)
  *H01M 8/04701* (2016.01)
  *H01M 8/0606* (2016.01)
  *H01M 8/124* (2016.01)

(52) U.S. Cl.
  CPC ... *H01M 8/04225* (2016.02); *H01M 8/04302* (2016.02); *H01M 8/04328* (2013.01); *H01M 8/04373* (2013.01); *H01M 8/04738* (2013.01); *H01M 8/0606* (2013.01); *H01M 2008/1293* (2013.01)

(56) References Cited

FOREIGN PATENT DOCUMENTS

| | | | |
|---|---|---|---|
| JP | 2012-79422 | A | 4/2012 |
| JP | 2014-26982 | A | 2/2014 |
| JP | 2016-207413 | A | 12/2016 |
| WO | WO 2013/035771 | A1 | 3/2013 |

\* cited by examiner

FUEL CELL SYSTEM CONTROL METHOD AND FUEL CELL SYSTEM

TECHNICAL FIELD

The present invention relates to a fuel cell system control method and a fuel cell system.

BACKGROUND ART

It is known that a solid oxide fuel cell (SOFC) is supplied with an anode gas and a cathode gas (air) and operates at a relatively high temperature. A fuel cell system including such the fuel cell is provided with a fuel processor that reforms at least fuel. The fuel processor is warmed up to a temperature at which reforming is possible and then reforms a fuel gas to generate an anode gas.

Because a temperature sensor is provided near the outlet of the fuel processor in order to determine whether the fuel processor reaches the temperature at which reforming is possible, it is necessary to supply a cathode gas before supplying a fuel gas when acquiring the temperature of the fuel processor. It is known that POX (partial oxidation) reforming is performed when the cathode gas is supplied before supplying the fuel gas. One of fuel cell systems warms a fuel processor at the starting-up of the system by using the property that POX reforming is an exothermic reaction (see WO2013/035771A1).

SUMMARY OF INVENTION

When supplying a cathode gas before supplying a fuel gas, oxygen is in an excessive condition compared to the fuel gas at the timing at which the fuel gas is supplied. For that reason, a reaction between the fuel gas and oxygen becomes easy to progress and the fuel processor has temperature excessively raised locally and thus the reforming performance of the fuel processor may be deteriorated. Therefore, it was necessary to study a fuel cell system that suppresses excessive temperature rise during the warming processing at the starting-up of the system.

The object of the present invention is to provide a fuel cell system control method and a fuel cell system, which suppress excessive temperature rise at the starting-up.

According to one of the embodiment of the present invention, a fuel cell system control method of controlling a fuel cell system when warming is performed at least at starting-up of the system, the fuel cell system including a solid oxide fuel cell that is supplied with an anode gas and a cathode gas to generate electric power, a fuel processor that at least reforms fuel to generate the anode gas and supplies the generated anode gas to the fuel cell, and a combustor that combusts the supplied fuel to perform warming of the fuel processor, the method having: a cathode gas supply step of supplying the cathode gas to the fuel processor; a determining step of determining whether a temperature of gas passing through the fuel processor is higher than a temperature at which reforming is possible; a cathode gas decreasing step of decreasing a supplied amount of the cathode gas to the fuel processor when it is determined that the temperature of the gas is higher than the temperature at which reforming is possible; and a fuel supply step of supplying the fuel to the fuel processor.

DESCRIPTION OF EMBODIMENTS

Hereinafter, exemplary embodiments of the present invention will be explained with reference to the accompanying drawings.

First Embodiment

Figure 1:
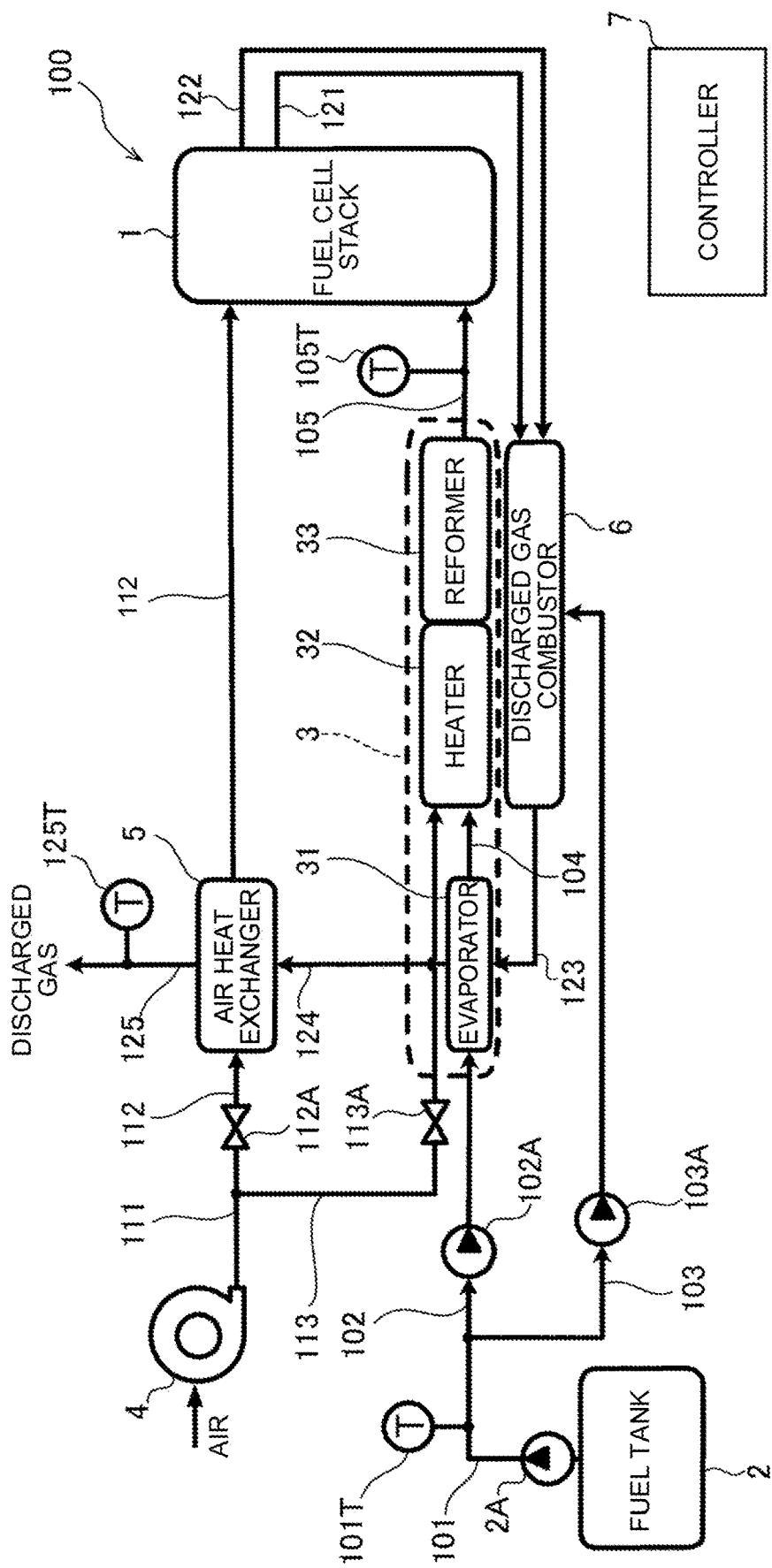
FIG. 1 is a block diagram illustrating a fuel cell system according to a first embodiment.

FIG. 1 is a block diagram illustrating the main configuration of a solid oxide fuel cell (SOFC) system according to the first embodiment.

A fuel cell stack 1 that is SOFC is made by stacking cells of which each is configured to sandwich an electrolyte layer formed of solid oxide such as ceramic between an anode electrode (fuel electrode) that is supplied with an anode gas (fuel gas) that is fuel and a cathode electrode (air electrode) that is supplied with air containing oxygen as a cathode gas (oxidation gas). The fuel cell stack 1 causes fuel such as hydrogen contained in the anode gas to react with oxygen in the cathode gas to generate electric power, and discharges an anode gas (anode offgas) after the reaction and a cathode gas (cathode offgas) after the reaction.

A solid oxide fuel cell system 100 (hereinafter, referred to as fuel cell system) including the fuel cell stack 1 is provided with a fuel supply system configured to supply an anode gas to the fuel cell stack 1, an air supply system configured to supply a cathode gas to the fuel cell stack 1, and an exhaust system configured to discharge an anode offgas and a cathode offgas outside the fuel cell system 100. In addition, the fuel cell system 100 is an example of a power generator including fuel cells.

The fuel supply system includes a fuel tank 2, a fuel processor 3, and the like. In addition, the fuel processor 3 is configured to include an evaporator 31, a heater 32 and, a"

reformer 33. The air supply system includes a cathode compressor 4 and an air heat exchanger 5. The exhaust system includes a discharged gas combustor 6. Moreover, the fuel cell system 100 includes a controller 7 that controls the overall operations of the system. The controller 7 controls each configuration, a motor, a valve, etc. of the fuel cell system 100 to control the fuel cell system 100.

Hereinafter, each system will be explained in detail. First, the fuel supply system will be explained in detail.

In the fuel supply system, fuel such as hydrous ethanol stored in the fuel tank 2 is pumped to a path 101 by using a pump 2A attached to the fuel tank 2. The path 101 branches into two paths 102 and 103. A pump 102A is provided in the path 102 and a pump 103A is provided in the path 103. In addition, a fuel thermometer 101T configured to measure the temperature of fuel is provided in the path 101. In addition, the pumps 2A, 102A, and 103A are an example of a fuel supply unit.

The fuel pumped from the fuel tank 2 via the path 102 is supplied to the evaporator 31. The evaporator 31 vaporizes liquid fuel to generate fuel gas by using the heat of gas discharged from the discharged gas combustor 6.

The fuel gas generated in the evaporator 31 reaches the heater 32 via a path 104. The heater 32 is provided adjacent to the discharged gas combustor 6, and can perform warming by further heating the fuel gas up to a temperature at which reforming is possible by the reformer 33 by using the combustion heat of the discharged gas combustor 6.

The fuel gas heated by the heater 32 is reformed to an anode gas by a catalytic reaction when reaching the reformer 33. Then, the anode gas is supplied from the reformer 33 to the anode electrode of the fuel cell stack 1 via a path 105.

In addition, a cathode gas is supplied to the heater 32 from the air supply system, and the cathode gas supplied to the heater 32 reaches the reformer 33. Just after the starting-up of the fuel cell system 100, the fuel gas and the cathode gas react with each other in the reformer 33 to cause an exothermic reaction. In addition, because an amount of heat generated in the discharged gas combustor 6 is small just after the starting-up, the warming of the reformer 33 is also performed by the exothermic reaction in the reformer 33.

Moreover, a thermometer 105T is provided in the path 105, and can measure the gas temperatures of the anode gas and the cathode gas passing through the reformer 33. In addition, because the temperature of the outlet of the reformer 33 is measured by the thermometer 105T, the temperature measured by the thermometer 105T will be below explained as an outlet temperature Tref. On the other hand, the fuel pumped from the fuel tank 2 via the path 103 is supplied to the discharged gas combustor 6. The detailed description for the discharged gas combustor 6 will be made later in the explanation for the exhaust system. For example, when the fuel is hydrous ethanol, the anode gas includes methane, hydrogen, carbon monoxide, and the like.

Next, the air supply system will be in detail explained.

In the air supply system, air that is a cathode gas taken from the outside is supplied to the fuel cell system 100 from a path 111 by the cathode compressor 4. The path 111 branches into two paths 112 and 113. A valve 112A is provided in the path 112 and a valve 113A is provided in the path 113. The cathode compressor 4 is an example of a cathode gas supply unit.

The cathode gas pumped from the cathode compressor 4 via the paths 111 and 112 reaches the air heat exchanger 5.

The air heat exchanger 5 heats the cathode gas by using the heat of gas discharged from the discharged gas combustor 6. The heated cathode gas is supplied to the fuel cell stack 1 via the path 113. In this way, the fuel cell stack 1 is supplied with the anode gas from the fuel supply system and the cathode gas from the air supply system.

On the other hand, the cathode gas pumped from the cathode compressor 4 via the paths 111 and 113 is supplied to the heater 32.

Next, the exhaust system will be in detail explained.

The anode offgas is discharged via a path 121 and the cathode offgas is discharged via a path 122, from the fuel cell stack 1. The anode offgas and the cathode offgas are combusted in the discharged gas combustor 6 by an oxidative catalytic reaction and are discharged as discharged gas. The heat generated by the combustion is transmitted to the heater 32 and the reformer 33 adjacent to the discharged gas combustor 6. The discharged gas reaches the evaporator 31 via a path 123 and then reaches the air heat exchanger 5 via a path 124. Then, the discharged gas is discharged outside of the fuel cell system 100 from the air heat exchanger 5 via a path 125.

The discharged gas combustor 6 is made of ceramic material such as alumina, and mixes the anode offgas and the cathode offgas and combusts their mixed gas by an oxidation catalyst to generate discharged gas containing carbon dioxide and water as the main component. In this way, the discharged gas combustor 6 combusts unburnt gas included in the discharged gas from the fuel cell stack 1.

However, for example, immediately after the starting-up of the fuel cell system 100, the unburnt gas is hardly included in the discharged gas and thus combustion cannot be performed sufficiently. In this regard, the discharged gas combustor 6 is supplied with fuel via the path 103 and combust the fuel to be able to perform warming.

The example in which the discharged gas from the discharged gas combustor 6 goes through the evaporator 31 and the air heat exchanger 5 in this order and is discharged outside the fuel cell system 100 has been explained for the exhaust system. However, the present embodiment is not limited to the above. For example, when the evaporator 31 and the heater 32 are provided in the fuel processor 3 to be separated from each other, the embodiment may have a configuration that the discharged gas from the discharged gas combustor 6 goes through the air heat exchanger 5 and the evaporator 31 in this order and is discharged outside the fuel cell system 100.

The controller 7 controls valves etc. in each configuration and each system of the fuel cell system 100 to control the entire of the fuel cell system 100. In addition, the controller 7 is configured of a microcomputer including a central processing unit (CPU), a read-only memory (ROM), a random-access memory (RAM), and an input-output interface (I/O interface). The controller 7 stores therein a program and executes the stored program to execute warming control to be described later, normal power generation control, and the like.

Herein, the warming control of the fuel cell system 100 will be explained with reference to a flowchart in FIG. 2. This warming control is performed when the fuel cell system 100 is started.

Figure 2:
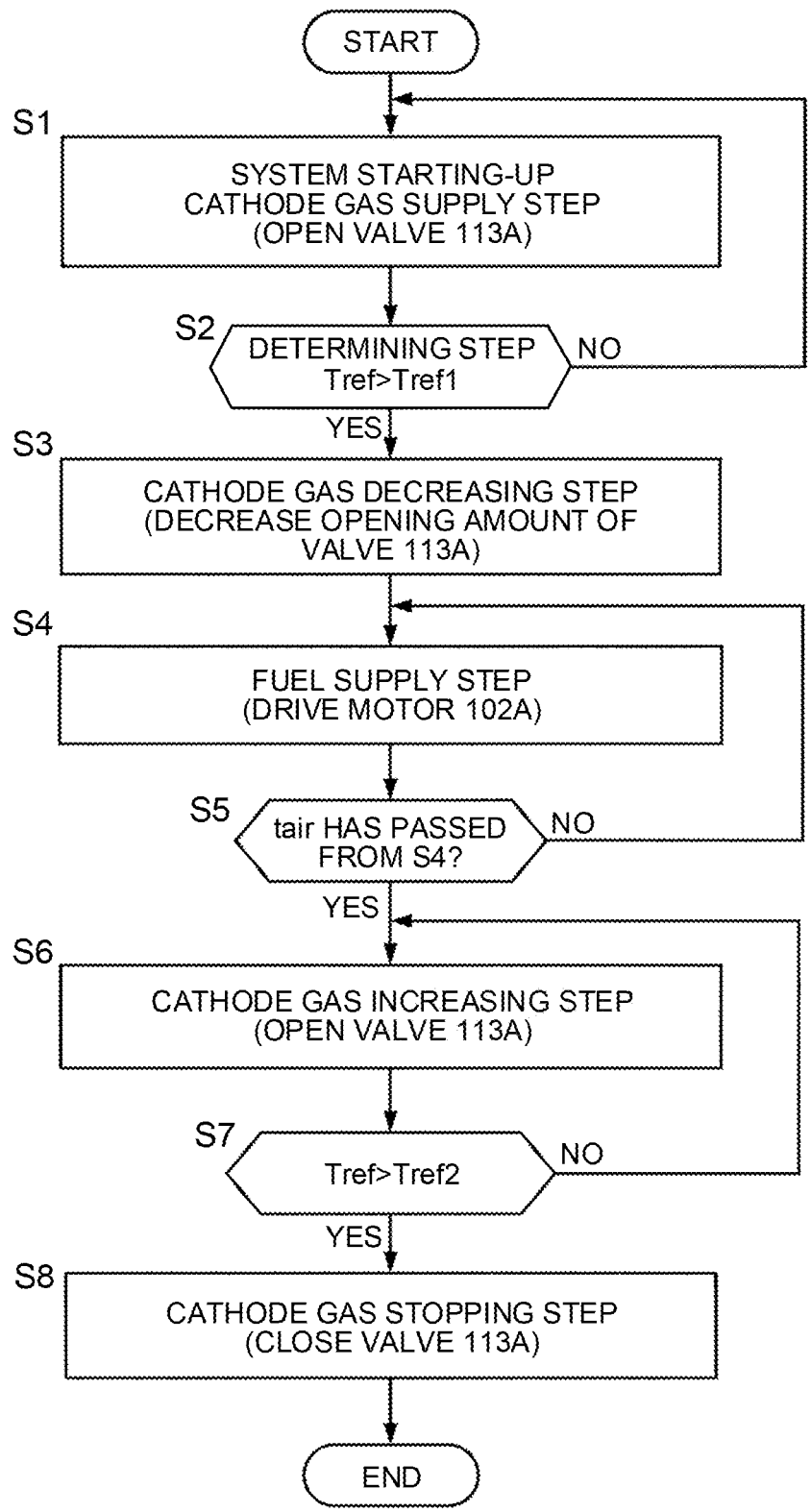
FIG. 2 is a flowchart illustrating warming control.

FIG. 2 is a flowchart illustrating the warming control of the fuel cell system 100.

In Step S1, the starting-up of the system and a cathode gas supply step are performed.

In the starting-up of the system, the controller 7 starts up the cathode compressor 4 and opens the valve 112A. By doing so, the supply of a cathode gas to the fuel cell stack 1 is started. At the same time, the controller 7 drives the pump 2A and the pump 103A to start to supply fuel to the discharged gas combustor 6. When the discharged gas combustor 6 combusts the supplied fuel, heating the heater 32 and the reformer 33 is started.

After the starting-up of the system, the cathode gas supply step is performed. The controller 7 opens the valve 113A to start to supply a cathode gas to the heater 32.

Next, in Step S2, a determining step is executed. The controller 7 determines whether the outlet temperature Tref of the fuel processor 3 measured by the thermometer 105T is higher than a temperature Tref1 at which reforming is possible. The temperature Tref1 at which reforming is possible is a lower-limit temperature at which reforming is possible in the reformer 33. The reformer 33 can start reforming at a temperature higher than the temperature Tref1 at which reforming is possible.

When the outlet temperature Tref is higher than the temperature Tref1 at which reforming is possible (S2: Yes), the controller 7 performs processing of the next Step S3 in order to start reforming. When the outlet temperature Tref is equal to or less than the temperature Tref1 at which reforming is possible (S2: No), the controller 7 returns to Step S1 to perform processing.

Next, a cathode gas decreasing step is performed in Step S3. The controller 7 makes the opening amount of the valve 113A smaller to decrease the supplied amount of the cathode gas to the heater 32 and the reformer 33. In addition, the controller 7 may close the valve 113A to stop supplying the cathode gas. Then, the controller 7 performs processing of the next Step S4.

In Step S4, a fuel supply step is performed. The controller 7 drives the pump 102A to start to supply fuel to the evaporator 31 from the fuel tank 2. When the fuel flows into the evaporator 31, the fuel is vaporized in the evaporator 31 to generate fuel gas. The generated fuel gas flows into the heater 32 to be heated and then is reformed to an anode gas by the reformer 33. Then, the anode gas is supplied to the fuel cell stack 1 via the path 105.

Next, in Step S5, the controller 7 determines whether a waiting time tair has passed after the execution of Step S4. Herein, the amount of fuel gas generated by the evaporator 31 is small just after the execution of Step S4 and is gradually increased. Therefore, a time from the start of fuel supply to the evaporator 31 to a timing at which the flow rate of fuel gas generated by the evaporator 31 exceeds a threshold as a sufficient amount is calculated previously, and this time is used as the waiting time tair.

When the waiting time tair has passed (S5: Yes), the controller 7 executes the next Step S6. When the waiting time tair has not passed (S5: No), the controller 7 returns to Step S4 to continue processing.

In Step S6, a cathode gas increasing step is executed. The controller 7 increases the opening amount of the valve 113A to increase the supplied amount of the cathode gas to the heater 32 and the reformer 33. In addition, when the valve 113A is closed in Step S3, the controller 7 opens the valve 113A. In this state, because the fuel gas and the cathode gas are supplied to the reformer 33, the outlet temperature Tref is further raised due to a reaction between the fuel gas and the anode gas.

Next, in Step S7, the controller 7 determines whether the outlet temperature Tref is higher than a warming completion temperature Tref2. The warming completion temperature Tref2 is a temperature at which the reformer 33 can appropriately perform reforming. The controller 7 terminates the warming control when the reformer 33 reaches the warming completion temperature Tref2. It is assumed that the warming completion temperature Tref2 is higher than the temperature Tref1 at which reforming is possible.

When the outlet temperature Tref is higher than the warming completion temperature Tref2 (S7: Yes), the controller 7 performs processing of the next Step S8 in order to terminate a warming operation. On the other hand, when the outlet temperature Tref is equal to or less than the warming completion temperature Tref2 (S7: No), the controller 7 returns to Step S6 to perform processing.

In Step S8, a cathode gas stopping step is performed. When closing the valve 113A, the controller 7 stops to supply the cathode gas to the heater 32 and the reformer 33 to terminate the warming control. Moreover, the controller 7 may stop the motor 102A to stop supplying the fuel to the discharged gas combustor 6. The controller 7 performs normal power generation control of the fuel cell stack 1 in the following.

Next, the flow rate of the fuel gas and the flow rate of the cathode gas supplied to the reformer 33 when the warming control in FIG. 2 is performed will be explained with reference to FIG. 3.

Figure 3:
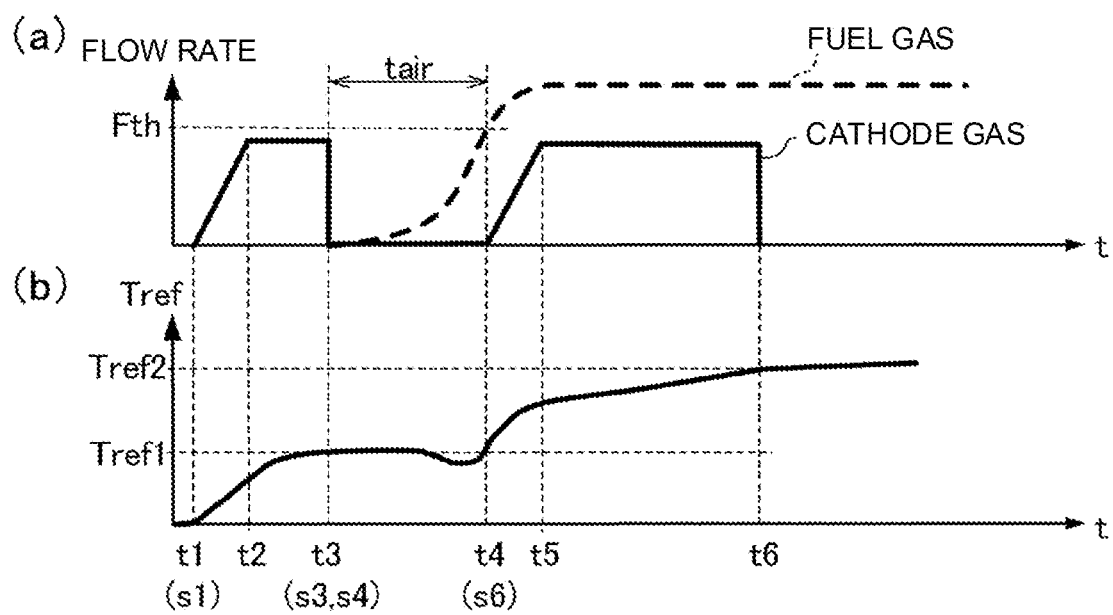
FIG. 3 is a diagram illustrating changes in the flow rates of a fuel gas and a cathode gas and an outlet temperature.

FIG. 3 is a diagram illustrating changes over time of the outlet temperature Tref and the flow rates of the fuel gas and the cathode gas to be supplied to the reformer 33 when the warming control in FIG. 2 is performed. FIG. 3($a$) has the x-axis indicating a time and the y-axis indicating the flow rates of the fuel gas and the cathode gas. FIG. 3($b$) has the x-axis indicating a time and the y-axis indicating the outlet temperature Tref. In FIG. 3, it is assumed that the valve 113A is closed and the flow rate of the cathode gas becomes zero in the cathode gas decreasing step of Step S3.

First, at a time t1, the starting-up of the system is performed and also the cathode gas supply step (S1) is executed.

As illustrated in FIG. 3($a$), when the cathode gas supply step is executed and the valve 113A is opened, the supply of the cathode gas is started. The flow rate of the cathode gas is gradually increased after the time t1 and, when reaching a supply target value at a time t2, is constant at the supply target value after the time t2.

As illustrated in FIG. 3($b$), the outlet temperature Tref starts to rise after the time t1. This is because a reaction between the fuel gas and the cathode gas proceeds and an exothermic reaction occurs in the reformer 33.

At a time t3, the outlet temperature Tref reaches the temperature Tref1 at which reforming is possible as illustrated in FIG. 3($b$). In this state, in accordance with the determination of "Yes" in the determining step (S2), the controller 7 executes the cathode gas decreasing step (S3) and the fuel supply step (S4).

In the cathode gas decreasing step (S3), the valve 113A is closed and the supply of the cathode gas to the reformer 33 is stopped. In the fuel supply step (S4), the pump 102A is driven and the supply of the fuel to the evaporator 31 is started.

As illustrated in FIG. 3($a$), because a vaporization rate of fuel in the evaporator 31 is slow just after the time t3, i.e., just after the start of the supply of fuel to the evaporator 31, the rise of the flow rate of fuel gas is slow. In addition, in comparison with a case where fuel gas that is gas is used, the slowness of the rise of the flow rate of fuel gas becomes remarkable when liquid that is fuel is used. In addition, a reason why the slowness of the rise of the flow rate of fuel gas becomes remarkable when fuel is liquid will be explained later with reference to FIG. 4 to FIG. 5C.

When it reaches a time t4, i.e., the waiting time tair has passed from the time t3, the flow rate of the fuel gas is higher than a threshold Fth. Herein, because a ratio of the cathode gas to the fuel gas is hard to increase when the fuel gas is higher than the threshold Fth even if the flow rate of the cathode gas is the supply target value, excessive heating is suppressed in the reformer 33. The flow rate of such the fuel gas is obtained as the threshold Fth, and a time from the start of fuel supply to the evaporator 31 to a timing at which the flow rate of the fuel gas becomes the threshold Fth is set as the waiting time tair. In this way, the waiting time tair is determined based on vaporization characteristics that liquid fuel vaporizes in the evaporator 31.

At the time t4, the controller 7 executes the cathode gas increasing step (S6) in accordance with the determination of "Yes" in Step S5. In the cathode gas increasing step, the valve 113A is opened and the supply of the cathode gas to the reformer 33 is resumed. In addition, because the flow rate of the fuel gas is higher than the threshold Fth and thus a ratio of the cathode gas to the fuel gas is suppressed, excessive heating is hard to occur in the reformer 33.

The flow rate of the cathode gas is gradually increased after the time t4 similar to the times t1 to t3 and becomes constant when reaching the supply target value at a time t5. In addition to the combustion of the discharged gas combustor 6, the outlet temperature Tref continues to rise due to an exothermic reaction in the reformer 33.

At a time t6, the outlet temperature Tref reaches the warming completion temperature Tref2 as illustrated in FIG. 3(b). In this state, the controller 7 executes the cathode gas stopping step (S8) in accordance with the determination of "Yes" in Step S7. In the cathode gas stopping step (S8), when the valve 113A is closed, the supply of the cathode gas to the reformer 33 is stopped. The warming control is completed in this way.

Herein, a reason why the slowness of the rise of the flow rate of fuel gas becomes remarkable when fuel is liquid will be explained with reference to FIG. 4 to FIG. 5C.

Figure 4:
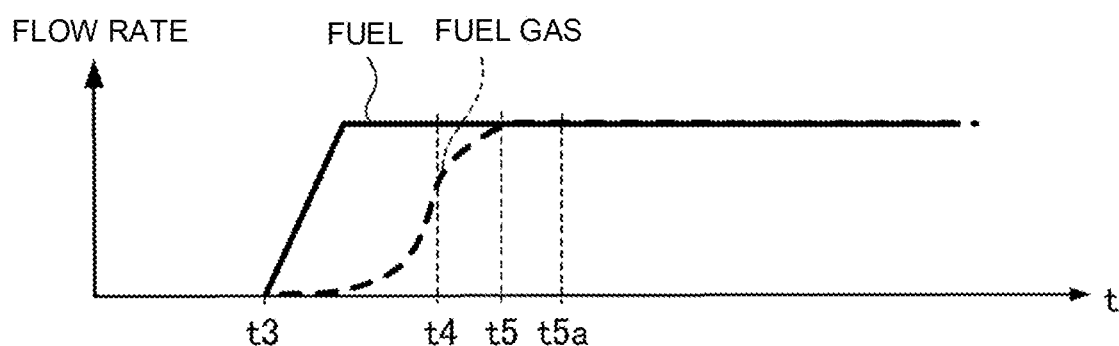
FIG. 4 is a diagram illustrating changes in the flow rates of fuel and fuel gas.

FIG. 4 illustrates the flow rate of fuel gas to be supplied to the reformer 33 illustrated in FIG. 3(a) with a dotted line and the flow rate of fuel to be supplied to the evaporator 31 with a solid line. Moreover, FIG. 4 illustrates a time t5a, at which the flow rates of fuel and fuel gas are constant, in addition to the times t3, t4, and t5.

Figure 5A:
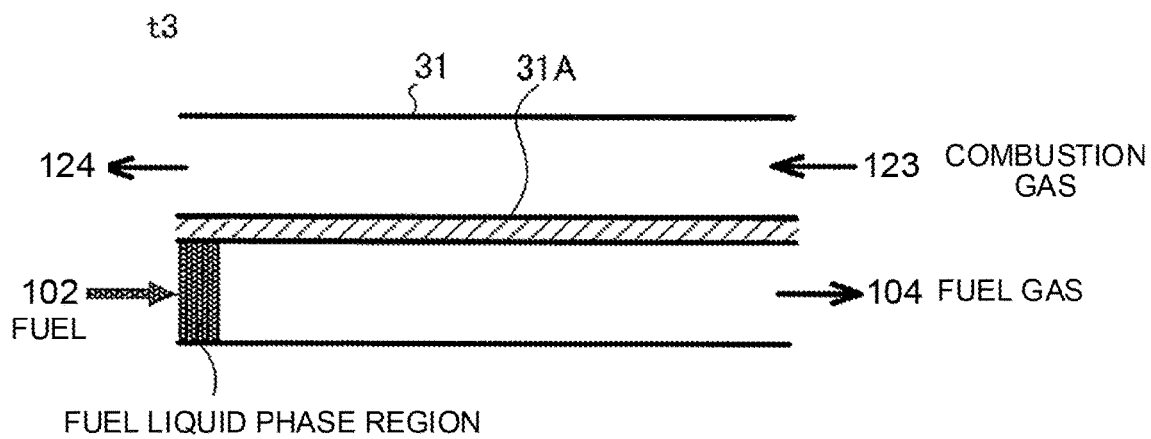
FIG. 5A is a configuration diagram of an evaporator at a time t3 in FIG. 4.
Figure 5B:
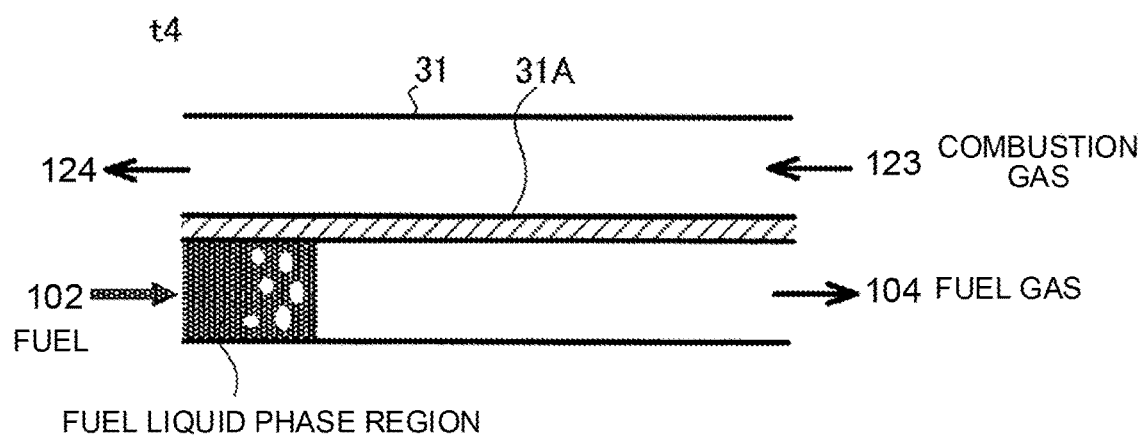
FIG. 5B is a configuration diagram of the evaporator at a time t4 in FIG. 4.
Figure 5C:
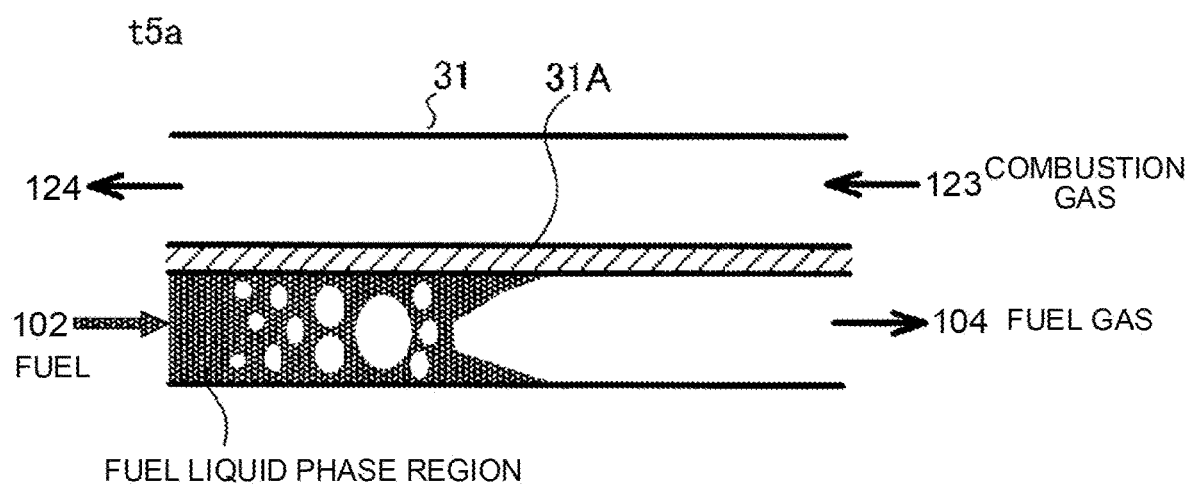
FIG. 5C is a configuration diagram of the evaporator at a time t5a in FIG. 4.

FIGS. 5A to 5C illustrate the detailed configuration of the evaporator 31 at various times. FIG. 5A illustrates the evaporator 31 at the time t3, FIG. 5B illustrates the evaporator 31 at the time t4, and FIG. 5C illustrates the evaporator 31 at the time t5a.

As illustrated in FIGS. 5A to 5C, the evaporator 31 is provided between the path 102 and the path 104 of the fuel system and is also provided between the path 123 and the path 124 of the exhaust system. In the evaporator 31, the fuel system and the exhaust system are adjacent to each other via an adjacent surface 31A. Moreover, it is assumed that a region in which fuel exists in the fuel system is referred to as a fuel liquid phase region.

The heat of the discharged gas in the exhaust system is transmitted to the adjacent surface 31A provided between the fuel system and the exhaust system. When the adjacent surface 31A is heated, fuel existing on the adjacent surface 31A is vaporized to generate fuel gas. In addition, in order to vaporize all of fuel to be supplied, the fuel liquid phase region must exist in a certain proportion or more of the adjacent surface 31A.

Referring to FIG. 4, as illustrated with a solid line, at the time t3, the supply of fuel to the evaporator 31 is started and the supply of fuel gas to the reformer 33 is also started.

As illustrated in FIG. 5A, even if the supply of fuel to the evaporator 31 is started, the fuel liquid phase region does not exist in all of the adjacent surface 31A and thus a proportion of the fuel liquid phase region to the adjacent surface 31A is relatively small. For that reason, the flow rate of fuel gas generated by vaporization on the adjacent surface 31A is small compared to the flow rate of fuel to be supplied.

Next, referring again to FIG. 4, the supplied amount of fuel gas to the reformer 33 begins to increase at the time t4.

As illustrated in FIG. 5B, more fuel is supplied to the evaporator 31 and thus the proportion of the fuel liquid phase region is increased. For that reason, because the proportion of the fuel liquid phase region in the adjacent surface 31A is increased, the flow rate of fuel gas is gradually increased.

Next, referring again to FIG. 4, the flow rate of fuel to be supplied becomes equal to the flow rate of fuel gas at the time t5a. In this state, the supplied amount of fuel becomes equal to the generation amount of fuel gas generated from fuel.

As illustrated in FIG. 5C, when the fuel liquid phase region exists in a certain proportion or more of the adjacent surface 31A, all of the fuel to be supplied is stably vaporized. For that reason, a state in which the fuel liquid phase region exists in the part of the adjacent surface 31A is continued constantly.

In this way, it needs a time until the fuel liquid phase region exists in a certain proportion or more of the adjacent surface 31A and all of the fuel to be supplied is stably vaporized after the supply of liquid fuel to the evaporator 31 is started. Therefore, when fuel is liquid, the slowness of the rise of the flow rate of fuel gas from the start of liquid fuel supply becomes remarkable.

Herein, the effect according to the present embodiment will be explained with reference to FIGS. 6 to 8.

Figure 6:
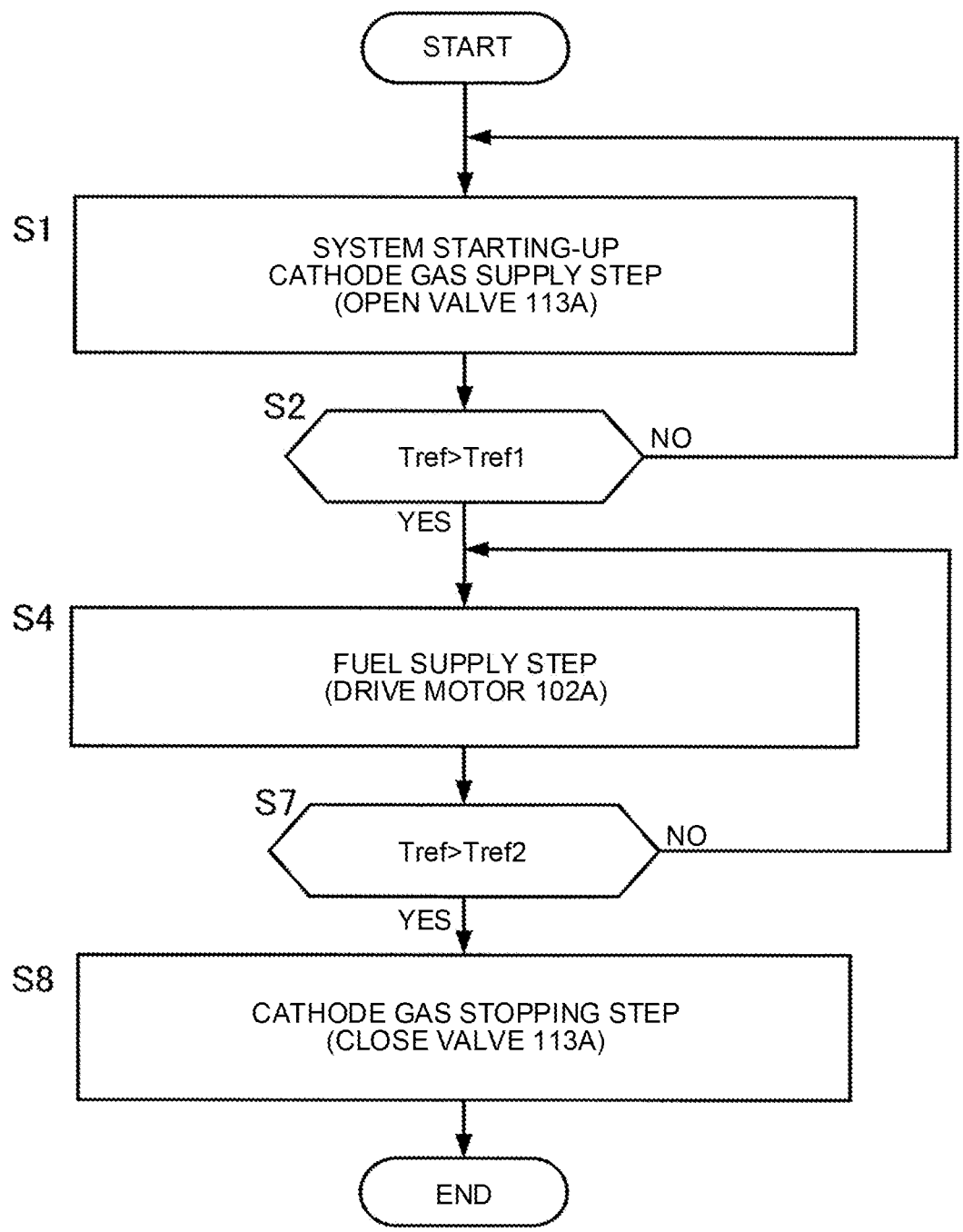
FIG. 6 is a flowchart illustrating warming control according to the conventional technology.

FIG. 6 is a flowchart illustrating warming control according to the conventional technology. According to this drawing, compared to the warming control in FIG. 2 according to the present embodiment, the processing of Steps S3, S5, and S6 is deleted and the processing of Steps S1, S2, S4, S7, and S8 is executed.

Figure 7:
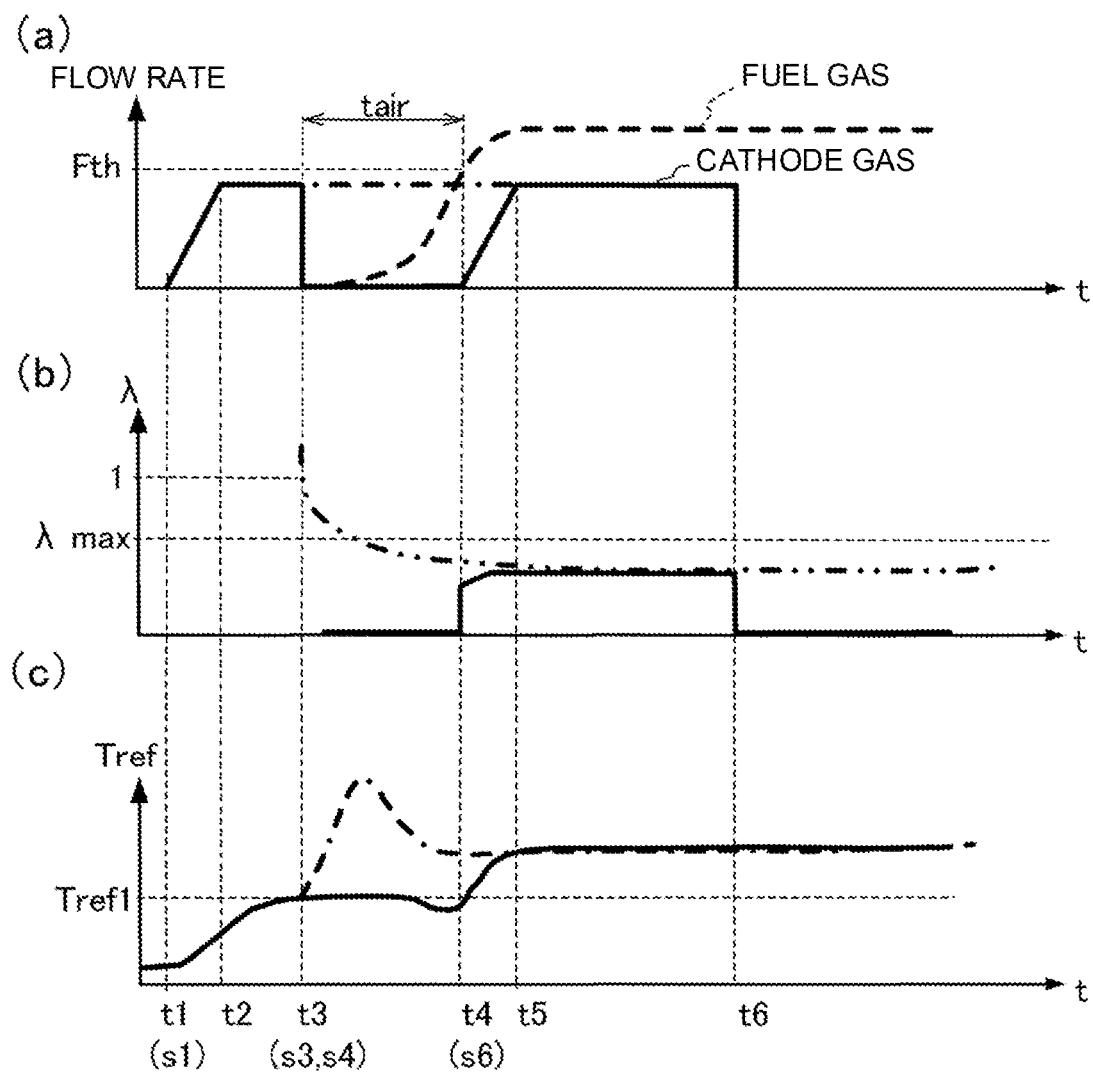
FIG. 7 is a diagram illustrating changes in the flow rates of a cathode gas and a fuel gas, an excess air ratio, and an outlet temperature.

FIG. 7 illustrates changes over time of the flow rates of the cathode gas and the fuel gas, an excess air ratio A, and the outlet temperature Tref.

Similar to FIG. 3(a), FIG. 7(a) illustrates the flow rate of the cathode gas with a solid line and the flow rate of the fuel gas with a dotted line. Furthermore, FIG. 7(a) illustrates with a dashed-dotted line the flow rate of the cathode gas when the warming control of FIG. 6 is performed.

FIG. 7(b) illustrates the change in the excess air ratio A. The excess air ratio $\lambda$ is a ratio of the flow rate of the cathode gas to the flow rate of the fuel gas. When the excess air ratio $\lambda$ is equal to 1, all of the cathode gas reacts with the fuel gas. Because the cathode gas is more than the fuel gas when the excess air ratio $\lambda$ is larger than 1, the amount of heat generation in the reformer 33 is increased.

In addition, this drawing illustrates an upper-limit excess air ratio $\lambda$max. By performing control so that the excess air ratio $\lambda$ falls below the upper-limit excess air ratio $\lambda$max, an exothermic reaction in the reformer 33 can be suppressed. The upper-limit excess air ratio $\lambda$max will be below explained with reference to FIG. 8.

Similar to FIG. 3(b), FIG. 7(c) illustrates the change in the outlet temperature Tref. Furthermore, this drawing illustrates with a dashed-dotted line the outlet temperature Tref when the warming control of FIG. 6 is performed.

Referring to FIG. 7(a), the case where the warming control of the conventional technology is performed is illustrated with a dashed-dotted line. In the conventional technology, the processing of Steps S3 and S6 is omitted. For that reason, between the times t3 and t4, the supply of the cathode gas is not stopped and is not changed at the supply target value. On the other hand, after the time t3, because the rise of the flow rate of fuel gas after the start of fuel supply is slow, the flow rate of fuel gas is extremely low.

The case where the warming control according to the present embodiment is performed is illustrated with a solid line. According to the present embodiment, because the processing of Steps S3 and S6 is performed, the supply of the cathode gas is stopped and thus the flow rate of the cathode gas is small between the times t3 and t4. On the other hand, the flow rate of fuel gas is higher than the threshold Fth at the time t4.

Referring to FIG. 7(b), according to the conventional technology illustrated with a dashed-dotted line, because the flow rate of the cathode gas is the supply target value and the flow rate of fuel gas is extremely low at the time t3, the excess air ratio $\lambda$ is much higher than 1. Then, when the flow rate of fuel gas is increased with the passage of time, the excess air ratio $\lambda$ is gradually decreased.

According to the present embodiment, as illustrated with a solid line, because the supply of the cathode gas is stopped between the times t3 and t4, the excess air ratio $\lambda$ is zero. Then, at the time t4, the supply of the cathode gas is resumed in the state where the flow rate of fuel gas is higher than the threshold Fth. For that reason, the excess air ratio $\lambda$ becomes relatively small, and the excess air ratio $\lambda$ after the time t4 is gradually increased without being suddenly raised.

Referring to FIG. 7(c), according to the conventional technology illustrated with a dashed-dotted line, because the excess air ratio $\lambda$ becomes extremely larger than 1 after the time t3, a reaction between the fuel gas and the cathode gas proceeds in the reformer 33 and thus the outlet temperature Tref is suddenly raised.

According to the present embodiment, as illustrated with a solid line, the rise of the excess air ratio $\lambda$ is suppressed. For that reason, the outlet temperature Tref is not changed between the times t3 and t4 and is gradually raised after the time t4.

In this way, according to the present embodiment, the rise of the excess air ratio $\lambda$ can be suppressed and the outlet temperature Tref can be prevented from being excessively high.

Figure 8:
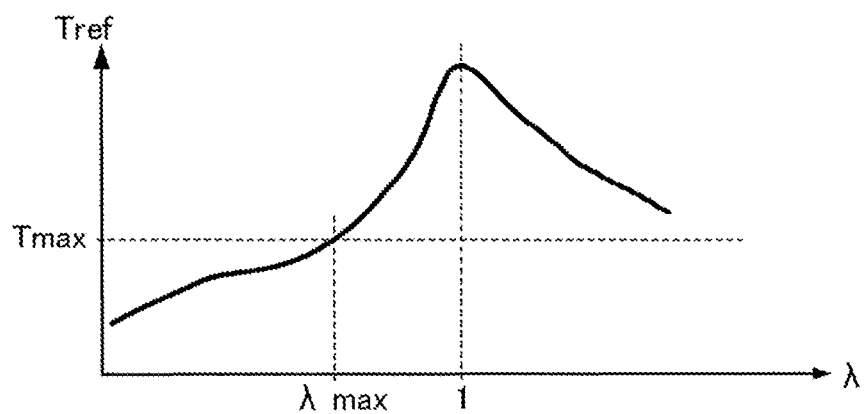
FIG. 8 is a diagram illustrating a relationship between the excess air ratio and the outlet temperature.

FIG. 8 illustrates, when the flow rate of the cathode gas is the supply target value in the reformer 33, a relationship between the excess air ratio $\lambda$ and the outlet temperature Tref of the reformer 33 when monotonously increasing the flow rate of fuel gas.

When increasing the flow rate of fuel gas, the excess air ratio $\lambda$ is increased and a reaction between the fuel gas and the cathode gas proceeds to raise the outlet temperature Tref. Because all of the fuel gas reacts with the cathode gas when the excess air ratio $\lambda$ becomes equal to 1, the amount of heat generation is increased and the outlet temperature Tref is maximized. Because all of the fuel gas reacts with the cathode gas and also the flow rate of the cathode gas increases when the excess air ratio $\lambda$ exceeds 1, the outlet temperature Tref decreases slowly.

An upper-limit temperature Tmax to avoid the deterioration of the reformer 33 is illustrated. When the outlet temperature Tref is higher than the upper-limit temperature Tmax, the reformer 33 might be damaged. However, before the excess air ratio $\lambda$ is raised up to 1, the outlet temperature Tref will exceed the upper-limit temperature Tmax. Therefore, the excess air ratio $\lambda$ when the outlet temperature Tref reaches the upper-limit temperature Tmax is defined as the upper-limit excess air ratio $\lambda$max. Herein, by controlling the excess air ratio $\lambda$ so as to fall below the upper-limit excess air ratio $\lambda$max, the outlet temperature Tref is prevented from reaching the upper-limit temperature Tmax and thus the reformer 33 can be protected.

In other words, as illustrated with a solid line in FIG. 7(b), in the present embodiment, because the excess air ratio $\lambda$ is controlled to fall below the upper-limit excess air ratio $\lambda$max, the outlet temperature Tref does not exceed the upper-limit temperature Tmax and thus the reformer 33 can be protected.

Next, that the temperature varies by location in the reformer 33 will be explained with reference to FIGS. 9 and 10.

Figure 9:
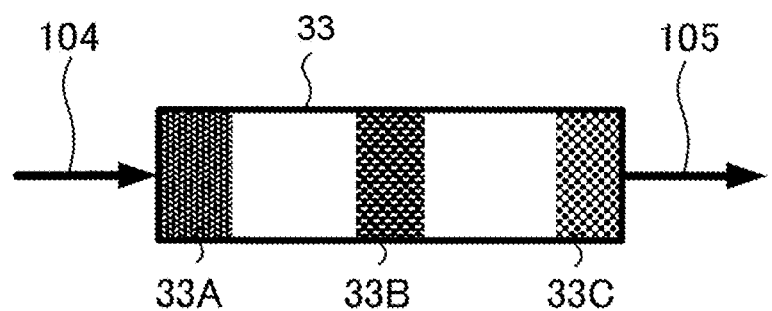
FIG. 9 is a schematic configuration diagram of a reformer.

FIG. 9 illustrates the detailed configuration of the reformer 33. In the reformer 33, the upstream side through which the fuel gas is supplied via the path 104 is referred to as an upstream portion 33A, the downstream side through which the anode gas is discharged via the path 105 is referred to as a downstream portion 33C, and a portion between the upstream portion 33A and the downstream portion 33C is referred to as a midstream portion 33B.

Figure 10:
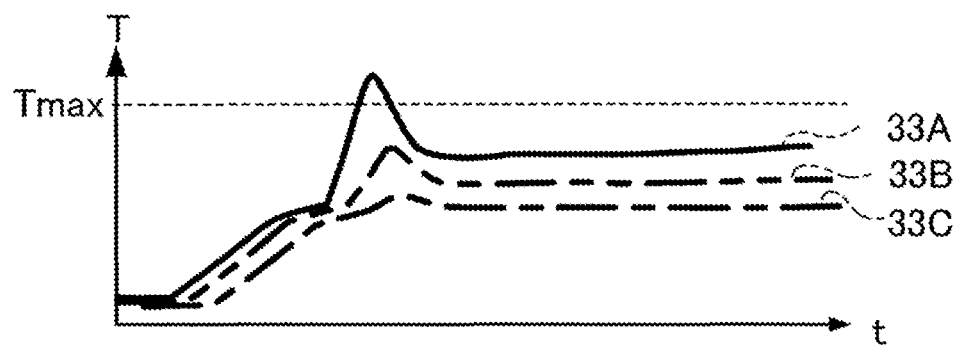
FIG. 10 is a diagram illustrating a temperature change in each component of the reformer.

FIG. 10 illustrates the temperature at each point in the reformer 33 when the warming control of FIG. 6 is performed. FIG. 10 illustrates the temperature of the upstream portion 33A with a solid line, the temperature of the midstream portion 33B with a dashed-dotted line, and the temperature of the downstream portion 33C with a two-dot chain line. Moreover, the upper-limit temperature Tmax is illustrated in this drawing.

The fuel gas is supplied in order of the upstream portion 33A, the midstream portion 33B, and the downstream portion 33C. For that reason, because the excess air ratio $\lambda$ is relatively large, the upstream portion 33A is easy to generate heat. On the other hand, because the flow rate of fuel gas to reach is relatively small and thus the excess air ratio $\lambda$ is relatively small, the downstream portion 33C is hard to generate heat. In this way, because the temperature is easy to become high in order of the upstream portion 33A, the midstream portion 33B, and the downstream portion 33C, the temperature of the upstream portion 33A may be higher than the upper-limit temperature Tmax.

For that reason, it is preferable to prepare a graph using a temperature T of the upstream portion 33A instead of the outlet temperature Tref of the y-axis in FIG. 8 and to define the excess air ratio $\lambda$ at a time point, at which the temperature T of the upstream portion 33A reaches the upper-limit temperature Tmax, as the upper-limit excess air ratio $\lambda$max. By doing like this, because the temperature of the upstream portion 33A surely falls below the upper-limit temperature Tmax, the reformer 33 can be protected. In addition, the upper-limit temperature Tmax may be set with a margin or may be set to a borderline value as a temperature at which the deterioration of reforming catalyst is started.

Herein, there is considered the reduction amount of the cathode gas when making the opening amount of the valve 113A smaller in the cathode gas decreasing step of Step S3.

Assuming that the flow rate of the cathode gas is fa, the amount of heat generation when all of the cathode gas is completely oxidized with the fuel gas can be indicated with Q(fa) as a function with the flow rate fa of the cathode gas as a variable. Herein, assuming that the heat capacity of a catalyst in the reformer 33 is C, a relationship of the heat capacity C, the amount of heat generation Q(fa), the temperature Tref1 at which reforming is possible, the upper-limit temperature Tmax, and the waiting time tair can be expressed like the following expression. In addition, the temperature Tref1 at which reforming is possible is the outlet temperature Tref when the cathode gas decreasing step (S3) is performed.

$$Q(fa) \cdot tair < C \cdot (Tmax - Tref1) \quad (1)$$

In Expression (1), the left-hand side is the integral value of the amount of heat generation and the right-hand side is the amount of heat that can be received by the reformer 33. By satisfying Expression (1), because the amount of heat generation is not higher than the receivable amount of heat of the reformer 33, the reformer 33 does not exceed the upper-limit temperature Tmax. For that reason, by adjusting the opening amount of the valve 113A so that the flow rate of the cathode gas is less than or equal to the flow rate fa satisfying Expression (1), the reformer 33 is prevented from reaching the upper-limit temperature Tmax.

According to the first embodiment, the following effects can be obtained.

According to the fuel cell system of the first embodiment, the controller 7 executes the cathode gas supply step (S1) at the starting-up of the system to start to supply the cathode gas to the reformer 33. Then, when it is determined that the outlet temperature Tref is higher than the temperature Tref1 at which reforming is possible in the determining step (S2) (S2: Yes), the controller executes the cathode gas decreasing step (S3) to decrease the supplied amount of the cathode gas to the reformer 33 and then executes the fuel supply step (S4) to start to supply the fuel gas to the reformer 33.

Because a vaporization rate from liquid fuel to fuel gas is not fast even if fuel is supplied to the evaporator 31 just after the fuel supply step, the rise of the flow rate of fuel gas is slow. On the other hand, the cathode gas starts to be supplied from the cathode gas supply step (S1) and has a sufficient flow rate. Therefore, by performing the cathode gas decreasing step (S3) to decrease the flow rate of the cathode gas, a ratio of the cathode gas to the fuel gas is lowered and thus the excess air ratio λ can be controlled low. Because excessive generation of heat can be suppressed by doing so, the reformer 33 can be protected.

Moreover, in the cathode gas decreasing step (S3), the flow rate of the cathode gas to the reformer 33 may be decreased. By doing so, the excess air ratio λ becomes low and thus excessive rise in temperature of the reformer 33 can be suppressed. Furthermore, because a reaction between the fuel gas and the cathode gas proceeds even while decreasing the flow rate of the cathode gas, the outlet temperature Tref is raised. Because a time until the outlet temperature Tref arrives up to the warming completion temperature Tref2 can be shortened, a time up to the warming completion can be shortened.

According to the fuel cell system of the first embodiment, in the cathode gas decreasing step (S3), the supply of the cathode gas to the reformer 33 may be stopped. By doing so, because the excess air ratio λ further becomes low, the excessive rise in temperature of the reformer 33 is further suppressed and thus the reformer 33 can be more surely protected.

According to the fuel cell system of the first embodiment, when the supplied amount of the fuel gas is higher than the threshold Fth after the waiting time tair has passed from the fuel supply step (S4), the controller 7 executes the cathode gas increasing step (S6). The rise of the supplied amount of the fuel gas is slow just after the start of the fuel supply, but the flow rate of fuel gas is higher than the threshold Fth when the waiting time tair has passed. For that reason, even if the flow rate of the cathode gas is increased by executing the cathode gas increasing step (S6), the rise in the excess air ratio λ is suppressed because the flow rate of fuel gas is higher than the threshold Fth. Therefore, the excessive heating of the reformer 33 is further suppressed and thus the reformer 33 can be protected.

According to the fuel cell system of the first embodiment, fuel is liquid, and the fuel processor 3 vaporizes fuel by using the evaporator 31 to generate a fuel gas and also reforms the fuel gas by using the reformer 33 to generate an anode gas.

When the flow rate of fuel gas to be supplied to the reformer 33 is higher than the threshold Fth after the waiting time tair has passed from the fuel supply step (S4) (S5: Yes), the controller 7 executes the cathode gas increasing step (S6).

It needs a time until fuel is stably vaporized on the adjacent surface 31A of the evaporator 31 to generate fuel gas after liquid fuel is supplied to the evaporator 31. For that reason, in consideration of vaporization characteristics that liquid fuel is vaporized, the waiting time tair is set. By executing the cathode gas increasing step (S6) after the waiting time tair has passed and the flow rate of fuel gas to be supplied to the reformer 33 is higher than the threshold Fth, the controller can cause the fuel gas to react with the cathode gas while suppressing the rise in the excess air ratio λ so as to perform the warming of the reformer 33.

According to the fuel cell system of the first embodiment, when the outlet temperature Tref is higher than the warming completion temperature Tref2, the cathode gas stopping step (S8) is performed. Because there is no need for further warming control when the outlet temperature is higher than the warming completion temperature Tref2, the controller stops to supply the cathode gas to the reformer 33 and stops to progress the reaction between the fuel gas and the cathode gas so as to complete the warming control. By doing so, in the following, the warming of the reformer 33 is completed and then the power generation control of the fuel cell stack 1 can be performed by using the anode gas generated by reforming the fuel gas in the reformer 33.

Second Embodiment

In the first embodiment, there has been explained an example in which the waiting time tair is previously obtained. However, the present invention is not limited to the above. The controller 7 may change the waiting time tair in accordance with the temperature of liquid fuel.

Figure 11:
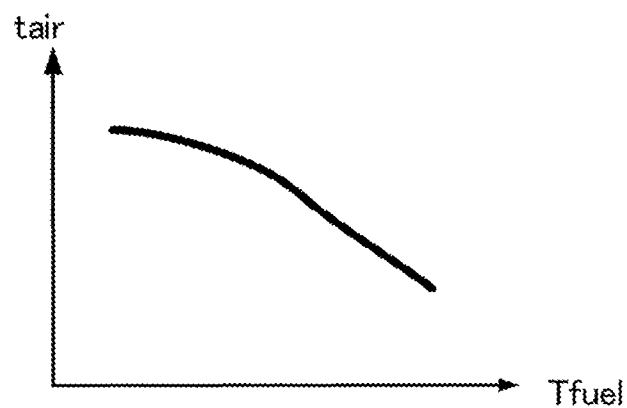
FIG. 11 is a graph illustrating a relationship between a waiting time and a liquid fuel temperature according to a second embodiment.

FIG. 11 is a graph illustrating a relationship between the waiting time tair and a liquid fuel temperature Tfuel. The x-axis indicates the liquid fuel temperature Tfuel and the y-axis indicates the waiting time tair. In addition, the liquid fuel temperature Tfuel is measured by the fuel thermometer 101T.

If the liquid fuel temperature Tfuel is high, it is not easy to vaporize because fuel is previously heated, and there is shortened a time until the flow rate of fuel gas is higher than the threshold Fth from the start of the supply of fuel to the evaporator 31. For that reason, as illustrated in this drawing, as the liquid fuel temperature Tfuel is higher, the waiting time tair is set shorter.

Figure 12:
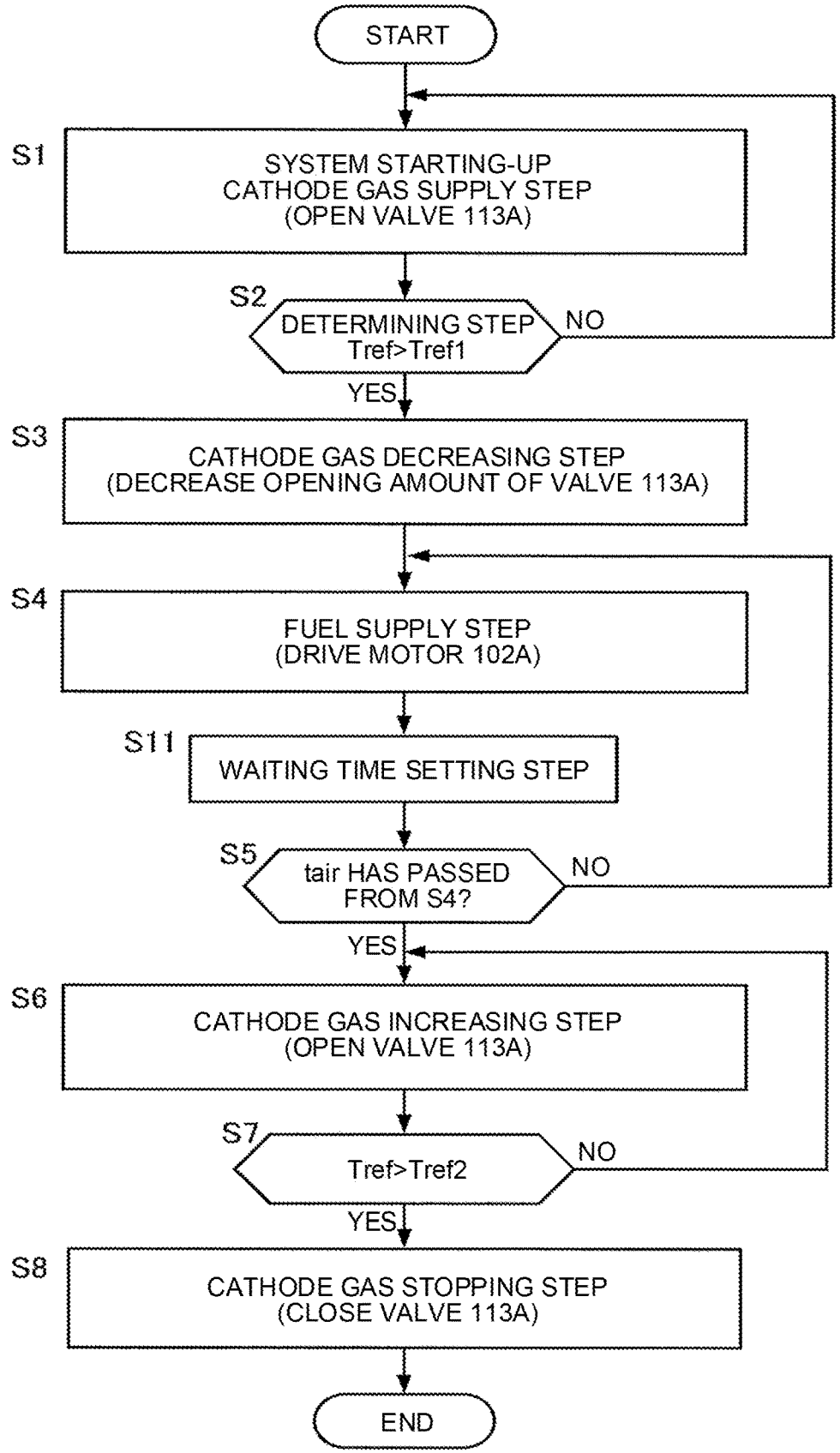
FIG. 12 is a flowchart illustrating warming control.

FIG. 12 is a flowchart illustrating the warming control according to the present embodiment. Compared to the flowchart of the warming control illustrated in FIG. 2 according to the first embodiment, this flowchart has processing of Step S11 added between the processing of Step S4 and the processing of Step S5.

In Step S11, a waiting time setting step is executed. The controller 7 obtains the waiting time tair based on the liquid fuel temperature Tfuel measured by the fuel thermometer 101T with reference to the graph illustrated in FIG. 11. More specifically, as illustrated in FIG. 11, as the liquid fuel temperature Tfuel is higher, the waiting time tair is set smaller. By doing so, it is possible to set the appropriate waiting time tair according to the temperature of fuel.

According to the second embodiment, the following effects can be obtained.

According to the fuel cell system of the second embodiment, the waiting time setting step (S11) is performed. The controller 7 sets the waiting time tair to be smaller as the liquid fuel temperature Tfuel measured by the fuel thermometer 101T is higher.

By doing so, because the waiting time tair is shortened when the temperature of fuel is high, a time up to the warming completion can be shortened. On the other hand, when the temperature of fuel is low, the flow rate of fuel gas is surely higher than the threshold Fth by lengthening the waiting time tair. For that reason, the warming of the reformer 33 can be performed by causing the fuel gas to react with the cathode gas while suppressing the rise in the excess air ratio A.

Third Embodiment

In the first and second embodiments, the process proceeds to the processing of Step S3 when the outlet temperature Tref is higher than the temperature Tref1 at which reforming is possible in the determining step (S2). However, the present invention is not limited to the above. In the determining step (S2), the temperature of the evaporator 31 may be further taken into consideration.

Figure 13:
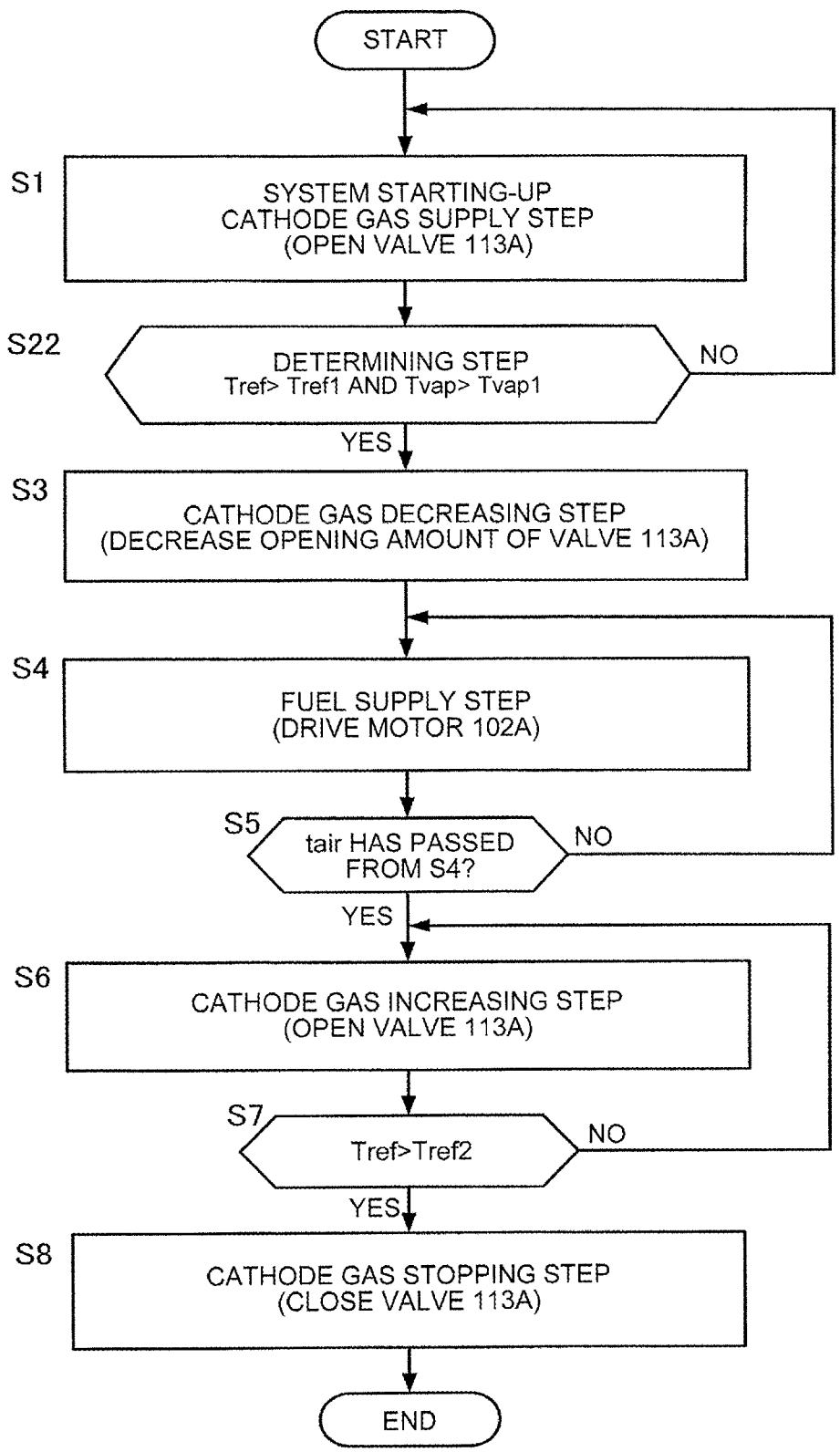
FIG. 13 is a flowchart illustrating warming control according to a third embodiment.

FIG. 13 is a flowchart illustrating warming control according to the present embodiment. Compared to the flowchart of the warming control illustrated in FIG. 2 according to the first embodiment, this flowchart has the processing of Step S22 that is changed from the processing of Step S2.

In Step S22, the determining step is performed. The controller 7 determines whether or not the outlet temperature Tref is higher than the temperature Tref1 at which reforming is possible and an evaporator temperature Tvap is higher than a vaporizable temperature Tvap1. In addition, the evaporator temperature Tvap is measured by an evaporator thermometer 125T provided in the path 125 connected to the evaporator 31.

In the evaporator 31, the vaporization of fuel proceeds when the evaporator temperature Tvap is higher than the vaporizable temperature Tvap1. Conversely, when the evaporator temperature Tvap falls below the vaporizable temperature Tvap1, the fuel is hard to vaporize. By performing the determining process of Step S22, the evaporator temperature Tvap is higher than the vaporizable temperature Tvap1. When the evaporator 31 is sufficiently heated to be able to vaporize fuel (Step S22: Yes), the vaporization of fuel appropriately proceeds because the supply of fuel to the evaporator 31 is started by the fuel supply step (S4).

According to the third embodiment, the following effects can be obtained.

According to the fuel cell system of the third embodiment, in the determining step (S22), when the outlet temperature Tref is higher than the temperature Tref1 at which reforming is possible and the evaporator temperature Tvap is higher than the vaporizable temperature Tvap1 (S22: Yes), the controller 7 executes the cathode gas decreasing step (S3) and then executes the fuel supply step (S4).

Because the evaporator temperature Tvap is higher than the vaporizable temperature Tvap1, the evaporator 31 is sufficiently heated and thus the vaporization of fuel is appropriately performed. For that reason, because the fuel supply step (S4) is executed only when the evaporator temperature Tvap is higher than the vaporizable temperature Tvap1 and the evaporator 31 is sufficiently heated to vaporize fuel (Step S22: Yes), the vaporization of fuel can be appropriately performed. For that reason, because the generation of fuel gas is appropriately performed, the flow rate of fuel gas is higher than the threshold Fth after the waiting time tair has passed (S5: Yes). The warming of the reformer 33 can be performed by causing the fuel gas to react with the cathode gas while suppressing the rise in the excess air ratio A.

Fourth Embodiment

In the first, second, and third embodiments, there has been explained an example in which liquid fuel is used and the evaporator 31 is provided. However, the present invention is not limited to the above. In the present embodiment, there will be explained an example in which gaseous fuel gas is used and the evaporator 31 is not provided.

Figure 14:
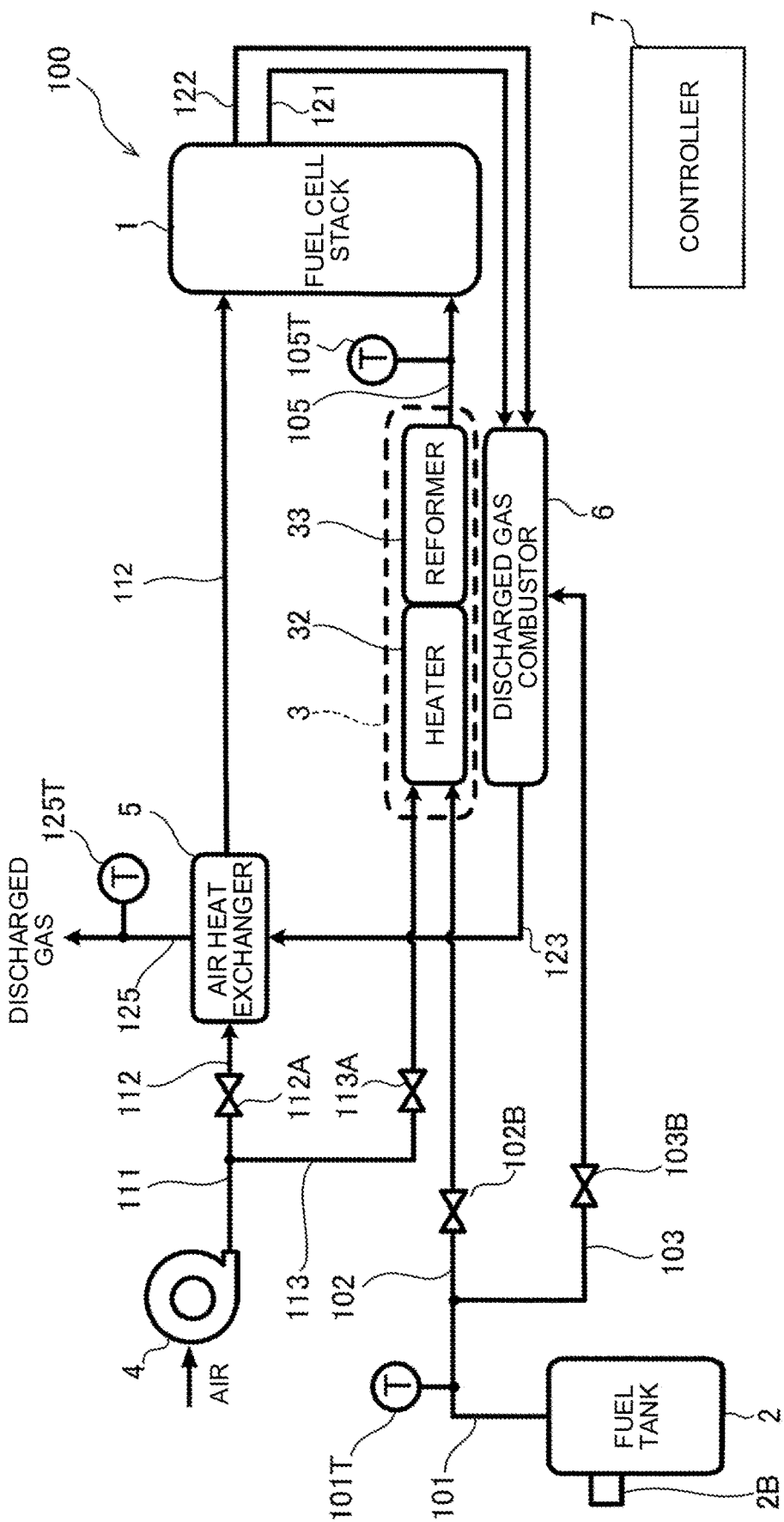
FIG. 14 is a block diagram illustrating a fuel cell system according to a fourth embodiment.

FIG. 14 is a block diagram illustrating a fuel cell system 100 according to the present embodiment. Compared to the fuel cell system 100 illustrated in FIG. 1 according to the first embodiment, the fuel cell system 100 according to the present embodiment includes the fuel processor 3 in which the evaporator 31 is not provided. Moreover, fuel gas is stored in the fuel tank 2, and a fuel blower 2B is provided instead of the pump 2A. Moreover, valves 102B and 103B are provided instead of the pumps 102A and 103A. In such a case, the fuel blower 2B and the valves 102B and 103B are an example of the fuel supply unit.

In such a case, the slowness of the rise is not remarkable compared to the case where liquid fuel is used, but the rise in the flow rate of fuel gas is slow just after the start of the supply of fuel gas to the heater 32. Therefore, in the present embodiment, a time from the driving of the fuel blower 2B to a timing at which the flow rate of fuel gas to the reformer 33 is higher than Fth is previously obtained, and this time is set as a waiting time tair2.

Figure 15:
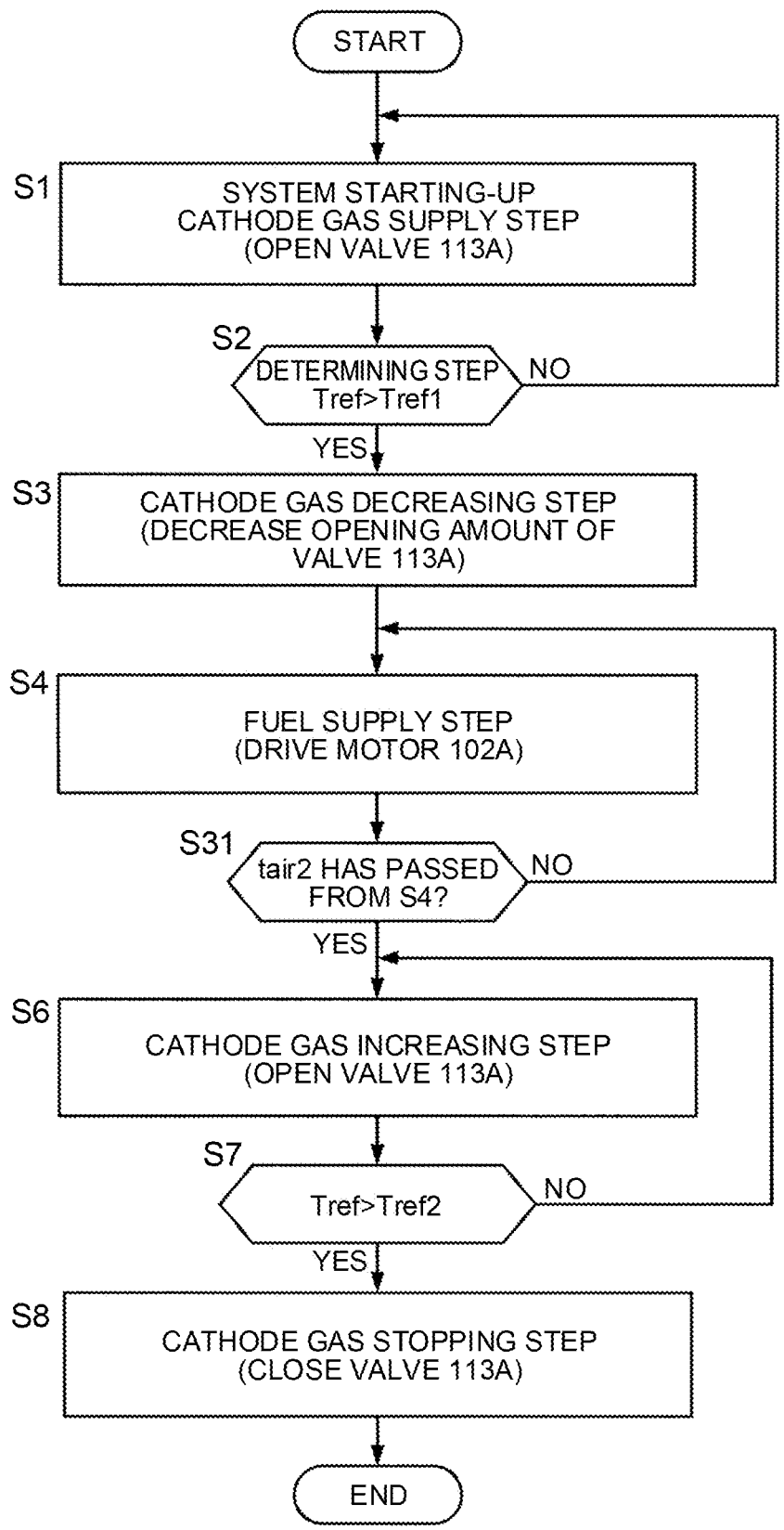
FIG. 15 is a flowchart of warming control.
Figure 16:
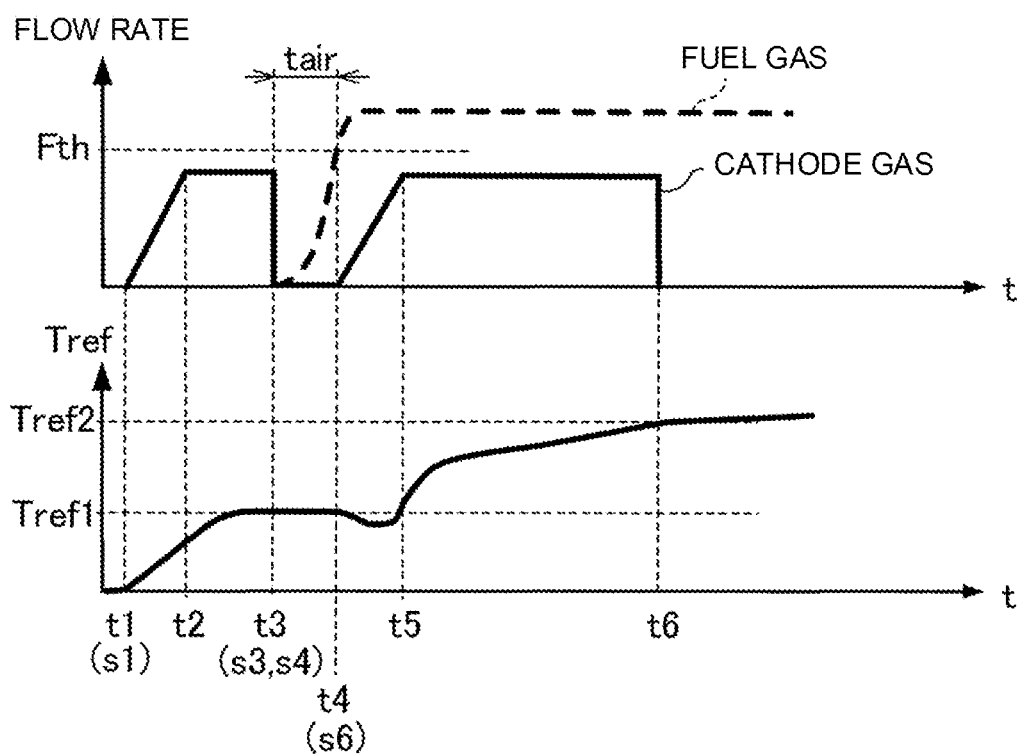
FIG. 16 is a diagram illustrating changes in the flow rates of a fuel gas and a cathode gas and an outlet temperature.

FIG. 15 illustrates a flowchart of warming control. According to this drawing, Step S31 is performed instead of Step S5. In Step S31, the controller 7 determines whether the waiting time tair2 has passed after Step S4. By doing so, because the flow rate of fuel gas to the reformer 33 is higher than Fth when the waiting time tair2 has passed (S31: Yes), the warming of the reformer 33 can be performed by causing the fuel gas to react with the cathode gas while suppressing the rise in the excess air ratio A.

According to the fourth embodiment, the following effects can be obtained.

According to the fuel cell system of the fourth embodiment, the controller 7 executes the cathode gas supply step (S1) at the starting-up of the system to start to supply the cathode gas to the reformer 33. Then, when the outlet temperature Tref is higher than the temperature Tref1 at which reforming is possible in the determining step (S2) (S2: Yes), the controller executes the cathode gas decreasing step (S3) to decrease the supplied amount of the cathode gas to the reformer 33 and also executes the fuel supply step (S4) to start to supply the fuel gas to the reformer 33.

Herein, the rise in the supplied amount of fuel gas to the reformer 33 is slow just after the fuel supply step. On the other hand, the cathode gas starts to be supplied from the cathode gas supply step (S1) and reaches the supply target value. For that reason, because a ratio of the flow rate of cathode gas to the flow rate of fuel gas, that is, the excess air ratio λ can be lowered by performing the cathode gas decreasing step (S3) to decrease the flow rate of cathode gas, the reformer 33 can be protected.

As described above, the embodiments of the present invention have been explained, but the above embodiments are only a part of the application example of the present invention and the technical scope of the present invention is not intended to be limited to the specific configurations of the above embodiments. Moreover, the above embodiments can be appropriately combined.

The invention claimed is:

1. A fuel cell system control method of controlling a fuel cell system when warming is performed at least at starting-up of the fuel cell system, the fuel cell system including a solid oxide fuel cell that is supplied with an anode gas and a cathode gas to generate electric power, a fuel processor that at least reforms fuel to generate the anode gas and supplies the generated anode gas to the fuel cell, and a combustor that combusts a supplied fuel to perform warming of the fuel processor, the method comprising:
a cathode gas supply step of supplying cathode gas to the fuel processor;
a determining step of determining that a temperature of gas passing through the fuel processor is higher than a lower limit temperature at which reforming is possible;
a cathode gas decreasing step of decreasing a supplied amount of cathode gas to the fuel processor when it is determined that the temperature of the gas passing through the fuel processor is higher than the lower limit temperature; and
a fuel supply step of supplying the fuel to the fuel processor after the cathode gas decreasing step.

2. The fuel cell system control method according to claim 1, wherein the cathode gas decreasing step further includes stopping supply of cathode gas to the fuel processor.

3. The fuel cell system control method according to claim 1, further comprising:
a cathode gas increasing step of increasing the supplied amount of cathode gas to the fuel processor when a predetermined waiting time has passed after supply of the fuel is started by the fuel supply step.

4. The fuel cell system control method according to claim 3, wherein
the fuel is liquid fuel,
the fuel processor includes an evaporator that evaporates the liquid fuel to generate fuel gas and a reformer that reforms the fuel gas to generate the anode gas, and
the predetermined waiting time is a time from starting to supply the liquid fuel by the fuel supply step to a timing at which a flow rate of the fuel gas to be supplied to the reformer from the evaporator is higher than a threshold.

5. The fuel cell system control method according to claim 4, further comprising:
a waiting time setting step of setting the waiting time shorter as a temperature of the liquid fuel is higher.

6. The fuel cell system control method according to claim 4, wherein
the determining step includes determining whether the temperature of the gas passing through the fuel processor is higher than the lower limit temperature and whether a temperature of the evaporator is higher than a vaporizable temperature of the fuel, and
the cathode gas decreasing step includes decreasing the supplied amount of cathode gas to the fuel processor when it is determined that the temperature of the gas passing through the fuel processor is higher than the lower limit temperature and the temperature of the evaporator is higher than the vaporizable temperature.

7. The fuel cell system control method according to claim 1, further comprising:
a cathode gas stopping step of stopping supply of cathode gas to the fuel processor when the temperature of the gas passing through the fuel processor is higher than a warming completion temperature which is higher than the lower limit temperature.

8. A fuel cell system comprising:
a solid oxide fuel cell that is supplied with an anode gas and a cathode gas to generate electric power;
a fuel processor that at least reforms fuel to generate the anode gas and supplies the generated anode gas to the fuel cell;
a combustor that combusts a supplied fuel to perform warming of the fuel processor;
a fuel supply unit configured to send the fuel to the fuel processor and the combustor;
a cathode gas supply unit configured to supply cathode gas to the fuel processor; and
a controller that controls the fuel supply unit and the cathode gas supply unit when the warming is performed at least at starting-up of the system, wherein
the controller is programmed to:
cause the cathode gas supply unit to supply cathode gas to the fuel processor;
determine that a temperature of gas passing through the fuel processor is higher than a lower limit temperature at which reforming is possible;
cause the cathode gas supply unit to decrease a supplied amount of cathode gas to the fuel processor when it is determined that the temperature of the gas passing through the fuel processor is higher than the lower limit temperature; and
cause the fuel supply unit to supply the fuel to the fuel processor after causing the cathode gas supply unit to decrease the supplied amount of cathode gas to the fuel processor.

* * * * *